United States Patent
Gandikota et al.

(10) Patent No.: US 11,572,835 B2
(45) Date of Patent: Feb. 7, 2023

(54) COMBUSTOR DILUTION HOLE

(71) Applicant: General Electric Company, Schenectady, NY (US)

(72) Inventors: Gurunath Gandikota, Bangalore (IN); Varun Lakshmanan, Bangalore (IN); Perumallu Vukanti, Bangalore (IN); Allen M. Danis, Mason, OH (US); Michael A. Benjamin, Cincinnati, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 17/317,131

(22) Filed: May 11, 2021

(65) Prior Publication Data
US 2022/0364510 A1 Nov. 17, 2022

(51) Int. Cl.
*F02C 7/18* (2006.01)
*F23R 3/16* (2006.01)
*F23R 3/06* (2006.01)
*F02C 7/22* (2006.01)
*F23R 3/28* (2006.01)

(52) U.S. Cl.
CPC .............. *F02C 7/18* (2013.01); *F02C 7/22* (2013.01); *F23R 3/06* (2013.01); *F23R 3/16* (2013.01); *F23R 3/28* (2013.01); *F05D 2240/127* (2013.01); *F05D 2240/35* (2013.01); *F05D 2260/232* (2013.01); *F23R 2900/03043* (2013.01)

(58) Field of Classification Search
CPC ...... F02C 7/18; F02C 7/22; F23R 3/06; F23R 3/16; F23R 3/28; F23R 2900/03043; F05D 2240/127; F05D 2240/35; F05D 2260/232
See application file for complete search history.

(56) References Cited

U.S. PATENT DOCUMENTS

| | | | | |
|---|---|---|---|---|
| 2,699,648 A | * | 1/1955 | Berkey | F23R 3/08 431/352 |
| 2,916,878 A | * | 12/1959 | Wirt | F23R 3/04 60/759 |
| 2,933,895 A | * | 4/1960 | Cheeseman | F23R 3/60 60/757 |
| 4,315,405 A | * | 2/1982 | Pidcock | F23R 3/04 60/751 |

(Continued)

*Primary Examiner* — J. Todd Newton
(74) *Attorney, Agent, or Firm* — Venable LLP; Peter T. Hrubiec; Michele V. Frank

(57) ABSTRACT

A turbofan gas turbine engine configured to reduce hotspots within combustors. The engine includes an axis and a combustor that is circumferentially disposed about the axis. The combustor includes an annular combustor liner that includes a front portion and a rear portion. The annular combustor liner is joined to an annular combustor dome via front portion and defines a chamber and a nozzle is mounted within the annular combustor dome and is configured to inject fuel into a plurality of swirlers. At least one or more dilution openings is circumferentially distributed around the liner such that a region is fluidly connected through the annular combustor liner to the chamber. Each one of the pluralities of dilution openings includes an opening and a radial support wall that is positioned aft of the opening such that the radial support wall extends into the chamber.

19 Claims, 6 Drawing Sheets

(56) References Cited

U.S. PATENT DOCUMENTS

| | | | | |
|---|---|---|---|---|
| 4,622,821 A * | 11/1986 | Madden | ............... | F23R 3/002 |
| | | | | 60/757 |
| 4,875,339 A * | 10/1989 | Rasmussen | ............... | F23R 3/06 |
| | | | | 60/757 |
| 4,938,020 A * | 7/1990 | Shekleton | ............... | F23R 3/04 |
| | | | | 60/743 |
| 5,235,805 A * | 8/1993 | Barbier | ............... | F23R 3/26 |
| | | | | 60/39.23 |
| 6,122,917 A * | 9/2000 | Senior | ............... | F28F 13/02 |
| | | | | 415/914 |
| 6,351,949 B1 * | 3/2002 | Rice | ............... | F23R 3/007 |
| | | | | 60/752 |
| 6,553,767 B2 | 4/2003 | Farmer et al. | | |
| 7,059,133 B2 | 6/2006 | Gerendas | | |
| 7,726,131 B2 | 6/2010 | Sze et al. | | |
| 8,408,010 B2 * | 4/2013 | Garry | ............... | F23R 3/60 |
| | | | | 60/798 |
| 10,094,564 B2 | 10/2018 | Lebel | | |
| 10,890,327 B2 * | 1/2021 | Gandikota | ............... | F23R 3/16 |
| 10,995,956 B2 * | 5/2021 | Kajimura | ............... | F02C 7/24 |
| 11,022,308 B2 * | 6/2021 | Rudrapatna | ............... | F23R 3/06 |
| 2001/0020359 A1 * | 9/2001 | Vermes | ............... | F23R 3/08 |
| | | | | 60/776 |
| 2012/0198855 A1 * | 8/2012 | Cihlar | ............... | F23R 3/06 |
| | | | | 60/760 |
| 2016/0131364 A1 | 5/2016 | Burd | | |
| 2016/0178199 A1 | 6/2016 | Burd | | |
| 2016/0209033 A1 | 7/2016 | Burd | | |
| 2019/0024894 A1 | 1/2019 | Mongillo et al. | | |
| 2019/0101289 A1 | 4/2019 | Mongillo, Jr. et al. | | |
| 2020/0063583 A1 * | 2/2020 | Bilse | ............... | F01D 9/023 |

\* cited by examiner

COMBUSTOR DILUTION HOLE

BACKGROUND OF THE INVENTION

The present invention relates generally to gas turbine engines, and more specifically, to combustors therein.

In a gas turbine engine, air is pressurized in a compressor and mixed with fuel in a combustor for generating hot combustion gases. The hot gases flow downstream through turbine stages which extract energy therefrom. A high pressure turbine powers the compressor. A low-pressure turbine produces useful work by powering an upstream fan in a typical turbofan gas turbine engine aircraft engine application, for example.

Combustor performance is critical to the overall performance of the gas turbine engine. The compressed air is mixed with fuel in the combustor for generating a fuel and air mixture which is ignited for generating the combustion gases.

Additional air is introduced through dilution openings into the combustor. The additional air is introduced out through the dilution openings are to provide a predetermined ratio of fuel to air in particular regions of the combustor.

BRIEF DESCRIPTION OF THE INVENTION

The technology disclosed herein is configured to reduce the liner wall gas temperature by as much as 500° F. and thereby eliminate hotspots thus leading to improved durability of the liners. Additional benefits include good controllability of profile/pattern factors and a reduction in the generation of $NO_X$.

According to one aspect of the present invention there is provided a turbofan gas turbine engine configured to reduce hotspots within combustors. The engine includes an axis and a combustor that is circumferentially disposed about the axis. The combustor includes an annular combustor liner that includes a front portion and a rear portion. The annular combustor liner is joined to an annular combustor dome via front portion and defines a chamber and a nozzle is mounted within the annular combustor dome and is configured to inject fuel into a plurality of swirlers. At least one or more dilution openings is circumferentially distributed around the liner such that a region is fluidly connected through the annular combustor liner to the chamber. Each one of the one or more dilution openings includes an opening and a radial support wall that is positioned aft of the opening such that the radial support wall extends into the chamber.

According to another aspect of the present invention, there is provided a turbofan gas turbine engine configured to reduce hotspots within combustors. The engine includes an axis and a combustor circumferentially disposed about the axis. The combustor includes an annular combustor dome. An annular combustor liner that includes a front portion and a rear portion and the annular combustor liner is joined to an annular combustor dome via front portion and defines a chamber and a nozzle is mounted within the annular combustor dome and is configured to inject fuel into a plurality of swirlers. The one or more dilution openings is circumferentially distributed around the liner such that a region is fluidly connected through the annular combustor liner to the chamber. Each one of the one or more dilution openings includes an opening and a radial support wall that is positioned aft of the opening such that the radial support wall extends into the chamber. Each one of the one or more dilution openings defines an annular slot. A lead channel fluidly connects the region with the opening. The support wall has a first leading side surface and a second aft side surface. At least one hole is defined through the support wall such that the first leading side surface is fluidly connected with the second aft side surface. A plurality of undulations is formed on at least one of the first leading side surface and the second aft side surface. A plurality of aft liner holes is positioned in the rear portion of the liner wall and are configured to fluidly connect the region with a potential recirculation zone. The support wall defines a generally perpendicular angle with an axis of the combustor and the second aft side surface of the support wall is positioned such that it defines an obtuse angle with the rear portion.

According to another aspect of the present invention, there is provided a method for reducing hotspots in a combustor turbofan gas turbine engine that includes an axis; a combustor circumferentially disposed about the axis; and the combustor includes an annular combustor dome; an annular combustor liner that includes a front portion and a rear portion and the annular combustor liner is joined to an annular combustor dome via front portion and defines a chamber and a nozzle is mounted within the annular combustor dome and is configured to inject fuel into a plurality of swirlers; a plurality of dilution openings are circumferentially distributed around the liner such that a region is fluidly connected through the annular combustor liner to the chamber; each one of the plurality of dilution openings includes an opening and a radial support wall that is positioned aft of the opening such that the radial support wall extends into the chamber; each one of the plurality of dilution openings defines an annular slot; a lead channel fluidly connects the region with the opening, the method comprising the steps of: causing combustion gases to flow through the combustion chamber past the dilution hole; introducing dilution air in the chamber via the dilution hole; and causing combustion gases to swirl and mix as a result of introducing the dilution air forward of the support wall.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
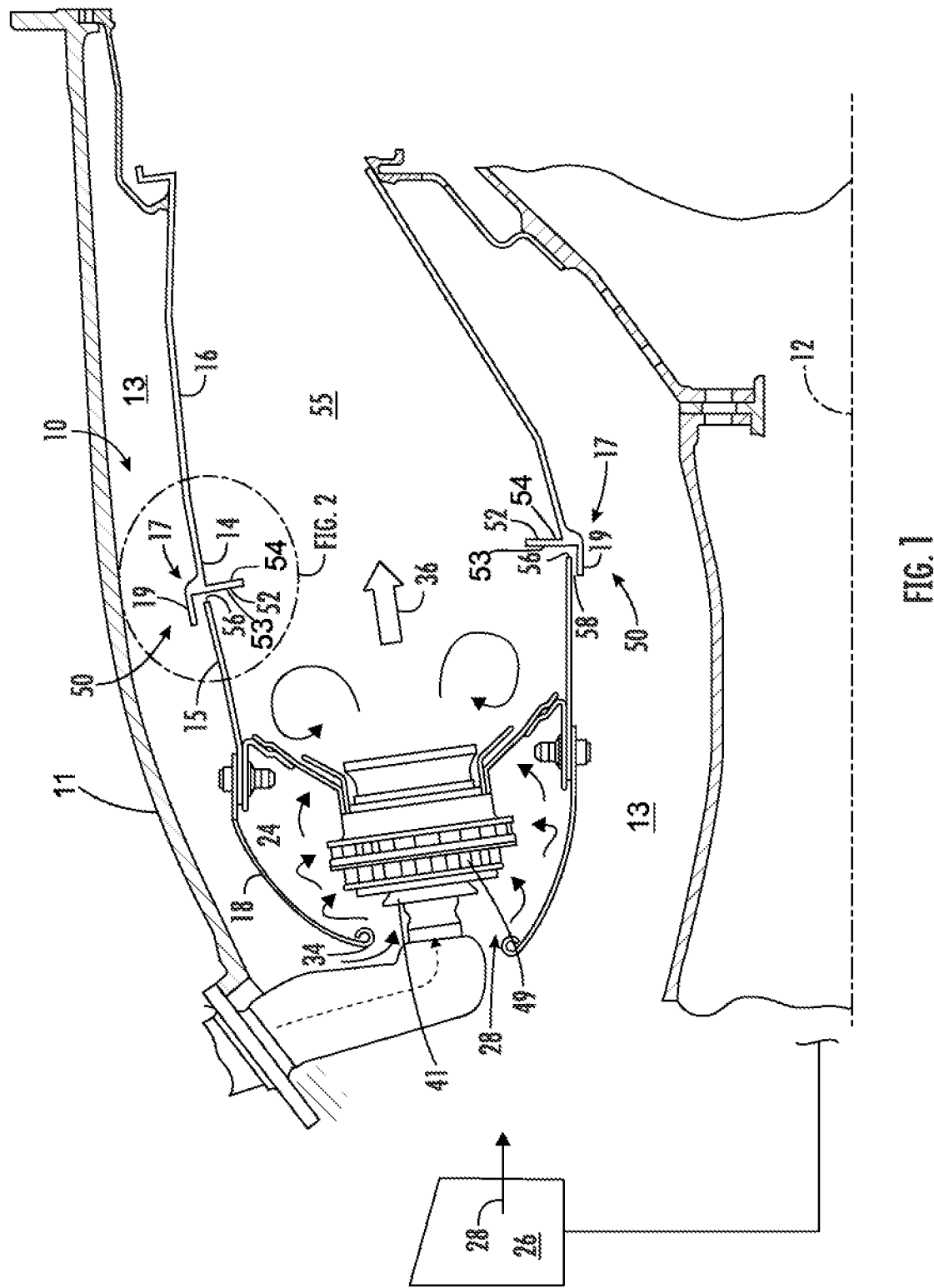
FIG. 1 is an axial, partly sectional view of a portion of an exemplary annular combustor of a turbofan gas turbine engine in accordance with the disclosed technology.

Referring to the drawings wherein identical reference numerals denote the same elements throughout the various views, the disclosed technology illustrated in FIG. 1 is a portion of an exemplary turbofan gas turbine engine including an annular combustor that includes a liner with step dilution openings described in detail below. Discrete dilution openings are conventionally known structures used to introduce dilution air into a combustor. Discrete dilution openings have inherent problems of hotspots forming axially aft. In addition, discrete dilution openings define recirculation zones aft which act to pull in hot gases during operation and thus lead to an increase production of $NO_x$. The step dilution openings of the present invention address this problem. The invention will be described according to multiple embodiments.

Figure 2:
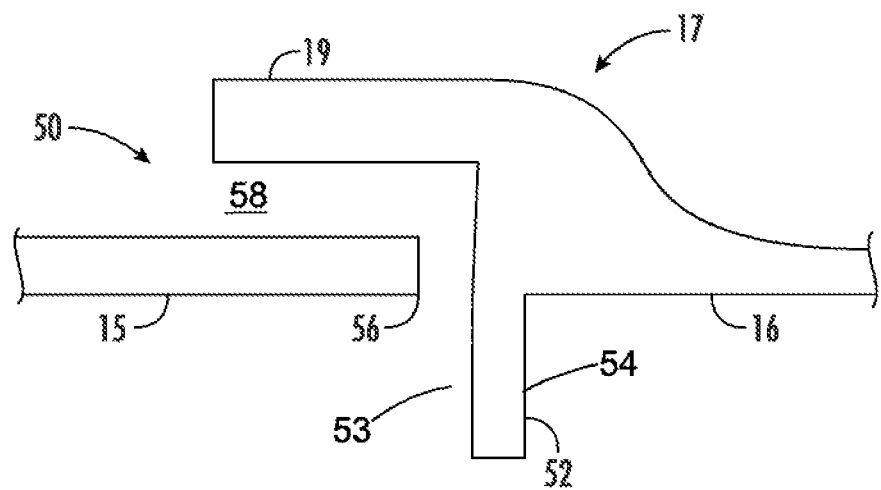
FIG. 2 is an enlarged, axial sectional view of another combustor in accordance with the disclosed technology taken at region 2 of FIG. 1.

Referring now to FIGS. 1 and 2, the annular combustor 10 is a singular annular combustor design and it is suitably mounted inside a casing 11 that is spaced-apart from a longitudinal or axial centerline axis 12. It should be appreciated that the exemplary turbofan gas turbine engine includes multiple annular combustors 10 circumferentially disposed about the centerline axis 12.

The combustor 10 includes an annular combustor liner 14 that includes integrally joined front and rear portions 15 and 16 respectively. The front and the rear portions 15 and 16 respectively are mechanically joined at joint 17. The rear portion 16 includes an overlapping liner portion 19 that extends over a portion of front portion 15. Overlapping liner portion 19 is used to create the joint 17 according to one embodiment and defines a lead channel 58. The annular combustor liner 14 is suitably joined at an upstream end via front portion 15 to an annular combustor dome 18. Radially outer and inner cowls extend axially forwardly from the dome 18 at the juncture with the outer and inner liners to define an annular plenum 24 on the upstream side of the dome 18. The exterior surfaces of the dome 18 and the aft liner 14 together with interior surfaces of casing 11 define a region 13.

As shown in FIG. 1, the engine includes a suitable compressor 26, such as a conventional multistage axial compressor, suitably configured for pressurizing an airstream 28 as the airstream 28 flows downstream therethrough. The pressurized airstream 28 is channeled axially downstream from the compressor 26 through a suitable diffuser and is introduced into the plenum 24 through a first annular inlet 34. The combustor 10 as described above and the compressor 26 may have any conventional configuration.

In accordance with the present invention, the combustor 10 illustrated in FIG. 1 includes a nozzle 41 and a plurality of swirlers 49 suitably mounted in the combustor dome 18. Each nozzle 41 injects fuel into the plurality of swirlers 49 wherein it is mixed within a throat with pressurized airstream air 28 for generating a fuel and air mixture which is suitably ignited for generating hot combustion gases 36 that collectively flow downstream through a chamber 55 defined by the combustor liner 14.

The combustion gases 36 are discharged from the outlet end of the combustor into a high pressure turbine (not shown) which extracts energy therefrom for powering the compressor 26. A low pressure turbine (not shown) is disposed downstream of the high pressure turbine and is suitably configured for producing output power, such as for powering an upstream fan in a typical turbofan gas turbine engine aircraft application.

The combustor 10 includes a one or more dilution holes 50 that are circumferentially distributed around liner 14 and are configured to fluidly connect the region 13 with the chamber 55. The dilution holes 50 of the presently disclosed technology are stepped as shown in FIGS. 1 and 2. A radial dilution support wall 52 is positioned just aft of an opening 56 in the combustor liner 14 such that the radial dilution support wall 52 extends into the chamber 55. The radial support wall 52 defines a leading surface 53 and an aft surface 54. The opening 56 in the combustor liner fluidly connects the region 13 to the combustor chamber 55 via at least one of the one or more dilution holes 50.

Figure 3:
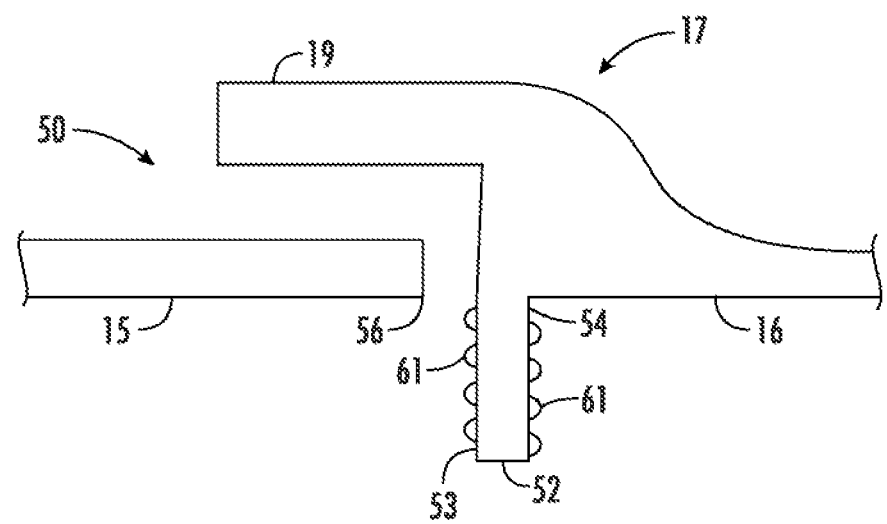
FIG. 3 shows alternate wall configurations of dilution openings in the combustor of FIG. 2 according to the disclosed technology.

As a principal embodiment, the opening 56 of the step dilution hole 50 can be formed as an annular slot or as adjacent multiple annular slots. In one embodiment, the opening 56 is fully annular. The shape of the stepped dilution hole can be uniform or nonuniform. In this regard, it can have a circumferential stepped hole with undulations 61 as shown in FIG. 3. The undulations 61 can be positioned on both the leading side 53 of the wall 52 and the aft side 54 of the wall 52. According to one embodiment the undulations 61 are positioned only on the leading side 53 of the wall 52. According to another embodiment, the undulations 61 are positioned only on the aft side 54 of the wall 52. The undulations can be of different shapes such as semicircular, triangular, rectangle, and other geometric shapes. Multiple such steps may be provided as required.

Figure 4:
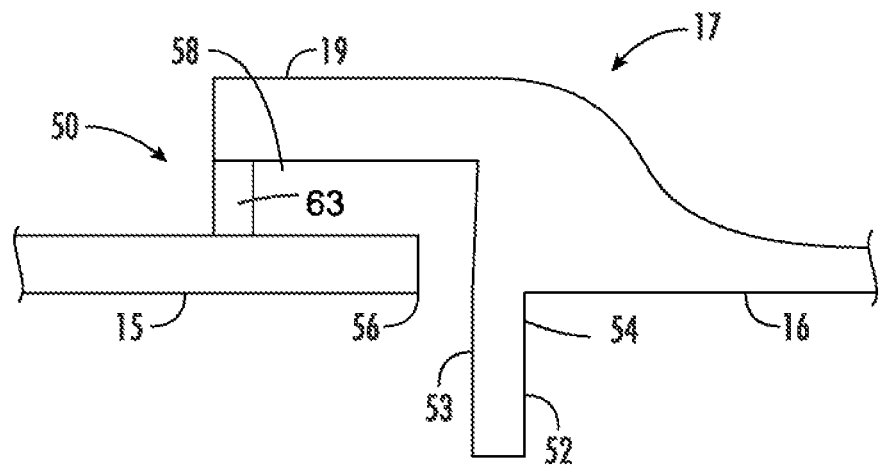
FIG. 4 shows a detailed view of a dilution hole according to the disclosed technology.
Figure 5:
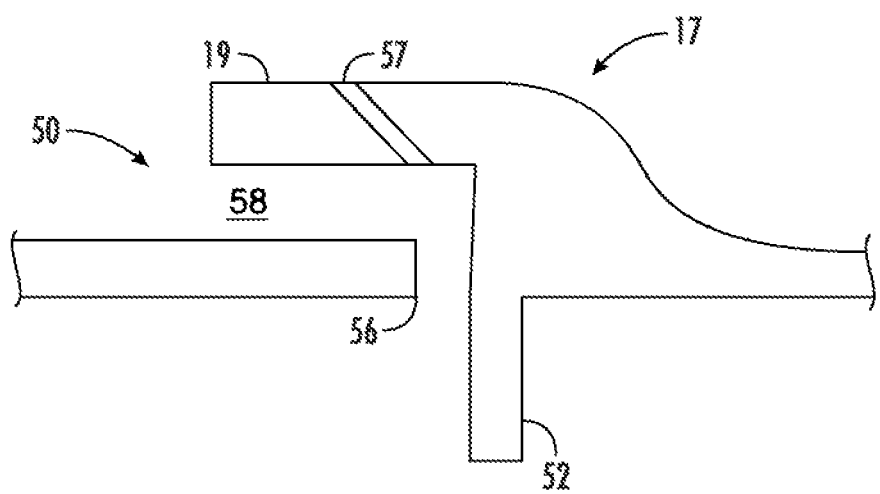
FIG. 5 shows another detailed view of a dilution hole according to the disclosed technology.

As shown in FIG. 4 and FIG. 5, the discrete joint overlap 19 is configured to define the lead channel 58. The lead channel 58 is configured to allow axial flow of dilution fluid therethrough from the region 13 to the hole 56. The joint overlap 19 can be vane-like such that they are configured to provide swirl to dilution flow. In this regard a vane 63 as shown in FIG. 4 ss positioned to provide a swirling flow to the dilution flow as it approaches hole 56 via lead channel 58. As shown in FIG. 5, stepped dilution hole 50 dilution flow is fed by holes/slots 57 that are defined through joint overlap 19.

Figure 6:
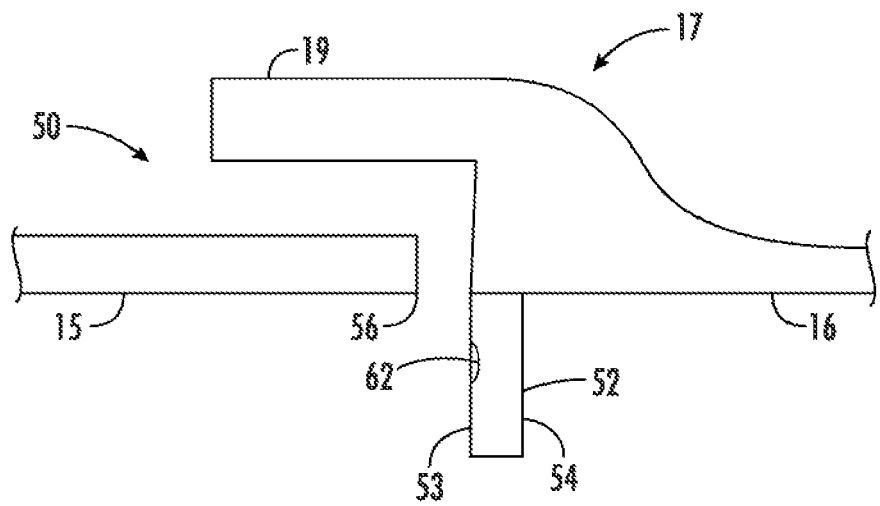
FIG. 6 shows another detailed view of a dilution hole according to the disclosed technology showing a radial wall that has a flow configurator formed on its upstream side.

Referring now to FIG. 6, the biggest advantage of having the support wall 52 is to improve penetration in mixing. According to some embodiments, the support wall 52 provides a surface that defines a turbulation feature 62 for causing turbulence. As used herein, the term "turbulation" indicates a feature that is configured to promote turbulence. As illustrated in FIG. 6, the feature 62 is a plurality of dimples, one of which is shown in cross-section. In other embodiments, features 62 can be configured as one of the following: a bump, notch, step, slot, other structure, and a combination thereof.

Figure 7:
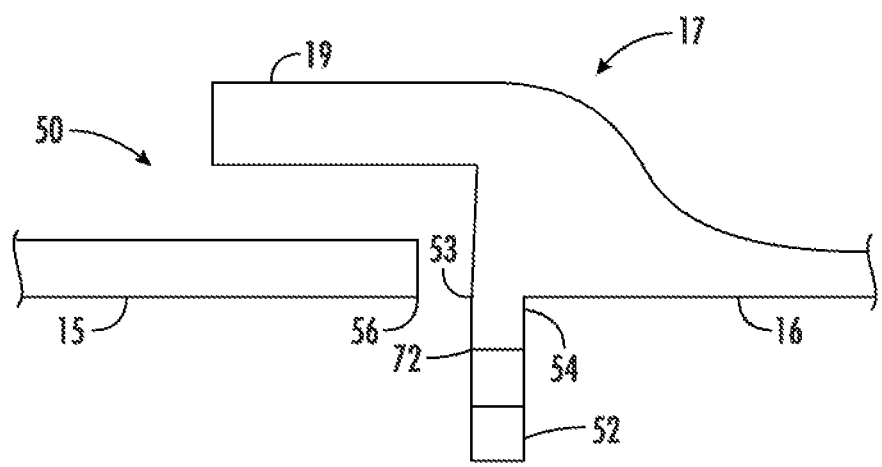
FIG. 7 shows another detailed view of a dilution hole according to the disclosed technology showing a radial wall having a plurality of axial holes formed therethrough.
Figure 8:
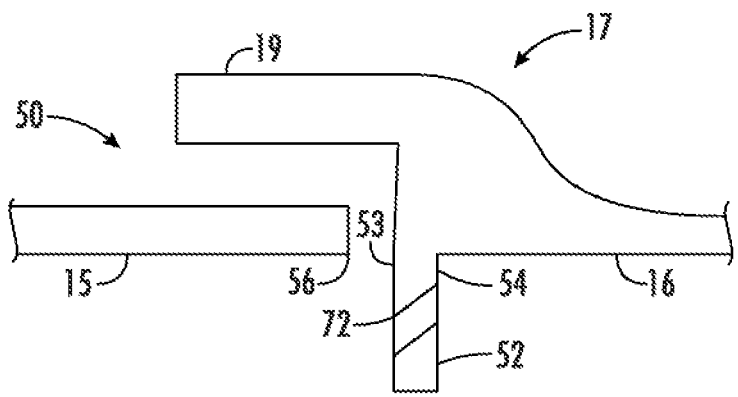
FIG. 8 shows another detailed view of a dilution hole according to the disclosed technology showing a radial wall having a plurality of outwardly angled holes formed therethrough.

Referring now to FIGS. 7 and 8, according to one embodiment a plurality of holes or perforations 72 are positioned across the support wall 52 to fluidly connect the first leading side surface 53 with the second aft side surface 54. In this manner, a portion of the dilution flow is introduced from forward of the dilution wall 52 through the dilution wall 52 to an area aft of the dilution wall 52. In this manner, wake mitigation is achieved. The plurality of holes or perforations 72 can be circular/rectangular or any shape as may be required or they can be nugget like structures. The arrangement of the plurality of holes or perforations 72 are determined such that the perforations 72 are configured to mitigate unwanted fluid dynamics forward raft of the support wall 52. It should be appreciated that the plurality of perforations 72 can be angled circumferentially, radially, axially, and a combination thereof. Perforations 72 as shown in FIG. 8 are angled.

Figure 9:
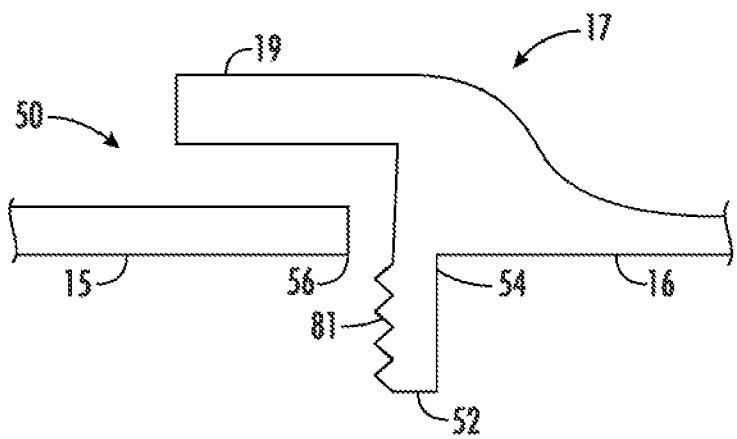
FIG. 9 shows a wall of a dilution hole having a chevron profile.

As shown in FIG. 9, the support wall 52 defines integral features 81. The shape of integral features 81 can be determined in various embodiments to further improve penetration and mixing of dilution air. The integral features 81 can be wavy, aerodynamically-shaped or shaped with steps, chevrons or other features to reduce or prevent a recirculation zone. As shown in FIG. 9, the integral features 81 define chevrons.

Figure 10:
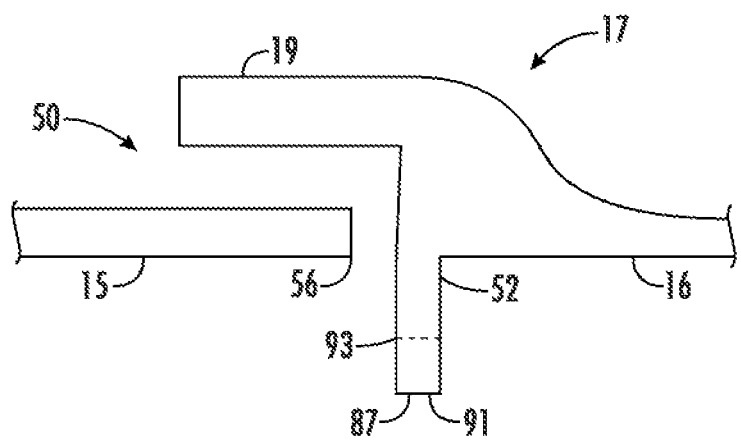
FIG. 10 shows a wall of a dilution hole having another profile.

As shown in FIG. 10 which is depicted looking aft parallel to the axis 12 and substantially perpendicularly to the support wall 52, the support wall 52 defines an edge 87. The edge 87 can be equidistant from axis 12 around the circumferential length of the support wall 42. Alternatively, the edge 87 can vary in distance from axis 12 to define other shapes. In FIG. 10 the support wall 52 is configured such that the edge 87 is wavy. In this regard, the edge 87 defines peaks 91 that are closer to axis 12 than valleys 93 (represented as a hidden line).

Figure 11:
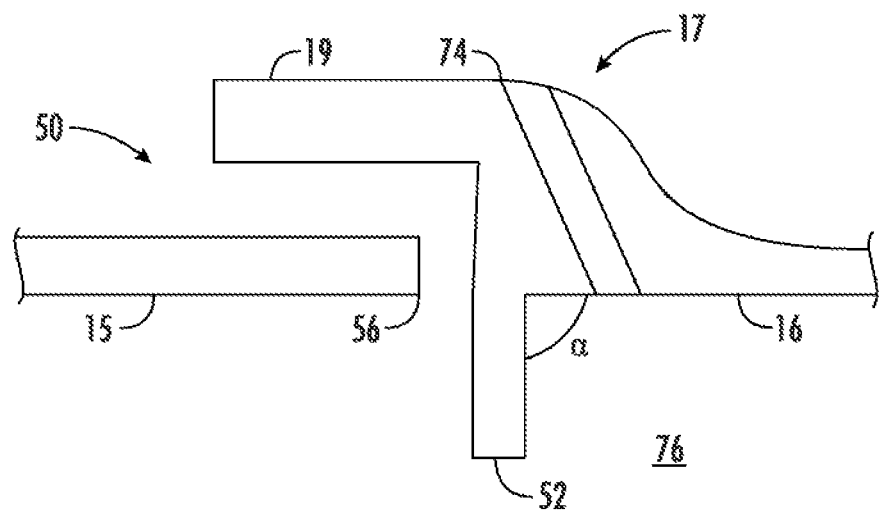
FIG. 11 shows a step dilution hole of the present invention having holes formed therethrough aft of the radial wall configured to weaken the recirculation zone.
Figure 12:
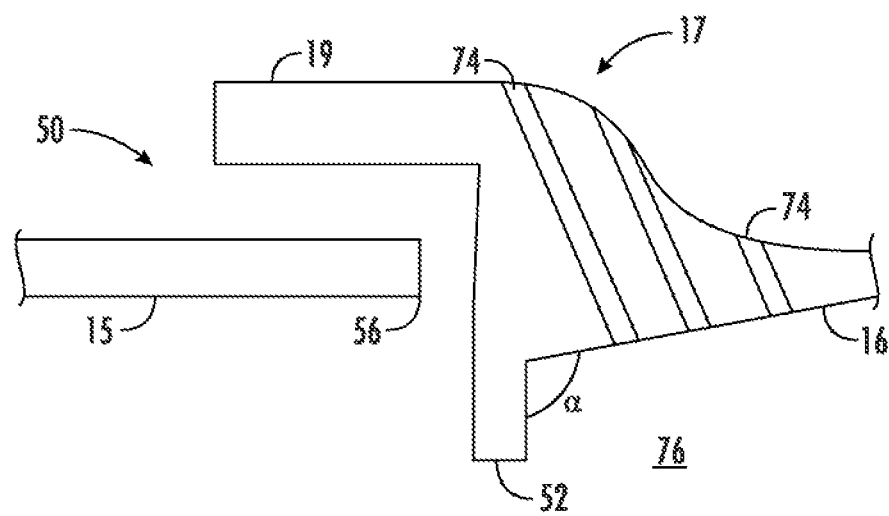
FIG. 12 shows a step dilution hole of the disclosed technology having an axial hole formed through the radial wall thereof and additional holes formed aft of the radial wall.

Referring now to FIG. 11, aft liner holes 74 are positioned downstream or aft of the dilution hole 56 and are configured to introduce air into a potential recirculation zone 76 that can be created by the support wall 52. As used herein, the term "recirculation zone" refers to an area where fluid flow, and subsequently mass transfer and heat transfer, is reduced relative to the flow of the combustor gases 36 through a central area of combustor chamber 55. One result of the formation of a recirculation zone is the creation of hotspots therefore a function of aft liner holes 74 is to reduce or eliminate hotspots relative to conventional turbine engines. The aft liner holes 74 can be slots/circular holes in a single row or, as shown in FIG. 12, multiple rows. They can also be utilized to attack a particular zone of hot gases enhancing mixing and can serve as an additional control profile/pattern factor.

As shown in FIGS. 11 and 12, support wall 52 defines an aft surface 84 and rear portion 16 defines an inner surface 82. As shown in FIG. 11, aft surface and 84 and inner surface 82 meet and together define and angle α and angle α is about 90°. As shown in FIG. 12 angle α greater than 90°. It should be appreciated that angle α can be defined by a changing thickness of either support wall 52 or changing thickness of rear portion 16 (as shown in FIG. 12). In the illustrated embodiment the support wall 52 is positioned perpendicular to the axis of the combustor. It should be appreciated that the support wall 52 may be inclined forward or aft relative to the axis of the combustor 10 and the magnitude of angle α can be determined by the inclination of support wall 52 relative the axis 12 of the combustor 10. Multiple support walls 52 may be provided.

It should be appreciated that the above-described structure can be additively manufactured such that the liner is one single part. Thus eliminating the need for two mounting features. In some embodiments, the liner is two separate parts that are mounted separately. It should be appreciated that the front and rear portions 15 and 16 can also be joined using fasteners such as bolts, with provision for air to pass either axially or radially through the holes.

The presently disclosed technology can be better understood from a description of the operation thereof. During operation of the combustor 10, air 28 is pressurized by compressor 26. Airstream 28 then flows through annular inlet 34 to enter plenum 24. Combustion gases 36 flows into combustor chamber 55. Dilution air flows through hole 50 to mix with combustion gases 36 and define the flow thereof to be more uniform and to reduce the formation of hotspots relative to the flow aft of conventional dilution holes. In some embodiments dilution air is further introduced via the aft liner holes 74 to prevent the formation of recirculation within the potential recirculation zones 76. The technology disclosed herein provides more predictable profiles within the combustor thus reducing early turbine maintenance problems associated with conventional technology. As the dilution air flows through hole 52 mix with combustion gases 36 fewer pollution byproducts such as in $NO_x$ are produced relative to conventional dilution air homes.

The foregoing has described an apparatus, i.e., a combustor that includes a stepped dilution hole. As a principal embodiment, the stepped dilution hole has an opening that has long annular slots with 2 or more joints. In a special case, the hole can be fully annular. The shape of the stepped dilution hole can be uniform or non-uniform. It can have a circumferential stepped hole with undulations as shown. The undulations can be of different shapes: semi-circular, triangular, rectangular etc. Multiple such steps may be provided as required.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not limited to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Further aspects of the invention are provided by the subject matter of the following numbered clauses:

1. A turbofan gas turbine engine configured to reduce hotspots within combustors, the engine comprising: an axis; a combustor circumferentially disposed about the axis; the combustor comprising: an annular combustor dome; an annular combustor liner that includes a front portion and a rear portion and the annular combustor liner is joined to an annular combustor dome via front portion and defines a chamber and a nozzle is mounted within the annular combustor dome and is configured to inject fuel into a plurality of swirlers; a one or more dilution openings is circumferentially distributed around the liner such that a region is fluidly connected through the annular combustor liner to the chamber; and wherein each one of the one or more dilution openings includes an opening and a radial support wall that is positioned aft of the opening such that the radial support wall extends into the chamber.

2. The turbofan gas turbine engine according any preceding clause, wherein: each one of the one or more dilution openings defines an annular slot.

3. The turbofan gas turbine engine according to any preceding clause, wherein a lead channel fluidly connects the region with the opening.

4. The turbofan gas turbine engine according to any preceding clause, wherein a vane that is configured to direct dilution air is positioned in the lead channel.

5. The turbofan gas turbine engine according to any preceding clause, wherein a hole is defined through the overlap and fluidly connects the region to one of: the lead channel, the opening, and a combination thereof.

6. The turbofan gas turbine engine according to any preceding clause, wherein the support wall has a first leading side surface and a second aft side surface and at least one hole is defined through the support wall such that the first leading side surface is fluidly connected with the second aft side surface 7. The turbofan gas turbine engine according to any preceding clause, wherein a plurality of undulations is formed on at least one of the first leading side surface and the second aft side surface.

8. The turbofan gas turbine engine according to any preceding clause, wherein a plurality of aft liner holes is positioned in the rear portion of the liner wall and are configured to fluidly connect the region with a potential recirculation zone.

9. The turbofan gas turbine engine according to any preceding clause, wherein the support wall defines a generally perpendicular angle with an axis of the combustor and the second aft side surface of the support wall is positioned such that it defines an obtuse angle with the rear portion.

10. The turbofan gas turbine engine according to any preceding clause, wherein a lead channel positioned such that the lead channel is configured to fluidly connect the region with the opening.

11. The turbofan gas turbine engine according to any preceding clause, wherein the support wall has a first leading side surface and a second aft side surface and a plurality of undulations are formed on the first leading side surface.

12. The turbofan gas turbine engine according to any preceding clause, wherein the support wall has a first leading side surface and a second aft side surface a plurality of undulations is formed on the second aft side surface.

13. A turbofan gas turbine engine configured to reduce hotspots within combustors, the engine comprising: an axis; a combustor circumferentially disposed about the axis; the combustor comprising: an annular combustor dome; an annular combustor liner that includes a front portion and a rear portion and the annular combustor liner is joined to an annular combustor dome via front portion and defines a chamber and a nozzle is mounted within the annular combustor dome and is configured to inject fuel into a plurality of swirlers; a at least one or more dilution openings is circumferentially distributed around the liner such that a region is fluidly connected through the annular combustor liner to the chamber; each one of the one or more dilution openings includes an opening and a radial support wall that is positioned aft of the opening such that the radial support wall extends into the chamber; each one of the one or more dilution openings defines an annular slot; a lead channel fluidly connects the region with the opening; the support wall has a first leading side surface and a second aft side surface; at least one hole is defined through the support wall such that the first leading side surface is fluidly connected with the second aft side surface; a plurality of undulations is formed on at least one of the first leading side surface and the second aft side surface; a plurality of aft liner holes is positioned in the rear portion of the liner wall and are configured to fluidly connect the region with a potential recirculation zone; and wherein the support wall defines a generally perpendicular angle with an axis of the combustor and the second aft side surface of the support wall is positioned such that it defines an obtuse angle with the rear portion.

14. The turbofan gas turbine engine according to any preceding clause, wherein a lead channel fluidly connects the region with the opening.

15. The turbofan gas turbine engine according to any preceding clause, wherein a vane that is configured to direct dilution air is positioned in the lead channel.

16. The turbofan gas turbine engine according to any preceding clause, wherein a hole is defined through the overlap and fluidly connects the region to one of: the lead channel, the opening, and a combination thereof.

17. The turbofan gas turbine engine according to any preceding clause, wherein the support wall has a first leading side surface and a second aft side surface and a plurality of undulations are formed on the first leading side surface.

18. The turbofan gas turbine engine according to any preceding clause, wherein the support wall has a first leading side surface and a second aft side surface a plurality of undulations is formed on the second leading side surface.

19. A method for reducing hotspots in a combustor turbofan gas turbine engine that includes an axis; a combustor circumferentially disposed about the axis; and the combustor includes an annular combustor dome; an annular combustor liner that includes a front portion and a rear portion and the annular combustor liner is joined to an annular combustor dome via front portion and defines a chamber and a nozzle is mounted within the annular combustor dome and is configured to inject fuel into a plurality of swirlers; at least one or more dilution openings are circumferentially distributed around the liner such that a region is fluidly connected through the annular combustor liner to the chamber; each one of the one or more dilution openings includes an opening and a radial support wall that is positioned aft of the opening such that the radial support wall extends into the chamber; each one of the one or more dilution openings defines an annular slot; a lead channel fluidly connects the region with the opening, the method comprising the steps of: causing combustion gases to flow through the combustion chamber past the dilution hole; introducing dilution air in the chamber via the dilution hole; and causing combustion gases to swirl and mix as a result of introducing the dilution air forward of the support wall.

20. The method according to any preceding clause, further comprising the steps of: introducing dilution air via holes through the aft liner aft of the support wall and thereby reducing potential recirculation zones.

What is claimed is:
1. A turbofan gas turbine engine configured to reduce hotspots within combustors, the turbofan gas turbine engine comprising:
   an axis;
   a combustor circumferentially disposed about the axis;
   the combustor comprising:
      an annular combustor dome;
      an annular combustor liner that includes a front portion and a rear portion and the annular combustor liner is joined to the annular combustor dome via the front portion and defines a chamber and a nozzle is mounted within the annular combustor dome and is configured to inject fuel into a plurality of swirlers;
      at least one or more dilution openings is circumferentially distributed around the annular combustor liner such that a region is fluidly connected through the annular combustor liner to the chamber;

wherein each one of the one or more dilution openings defines an annular slot; and wherein each one of the one or more dilution openings includes an opening and a radial support wall that is positioned aft of the opening such that the radial support wall extends into the chamber.

2. The turbofan gas turbine engine according to claim 1, wherein a lead channel fluidly connects the region with the opening.

3. The turbofan gas turbine engine according to claim 2, wherein a vane that is configured to direct dilution air is positioned in the lead channel.

4. The turbofan gas turbine engine according to claim 3, wherein a hole is defined through an overlapping liner portion of the annular combustor liner and fluidly connects the region to one of: the lead channel, the opening, and a combination thereof.

5. The turbofan gas turbine engine according to claim 4, wherein the radial support wall has a first leading side surface and a second aft side surface and at least one hole is defined through the radial support wall such that the first leading side surface is fluidly connected with the second aft side surface.

6. The turbofan gas turbine engine according to claim 5, wherein a plurality of undulations is formed on at least one of the first leading side surface and the second aft side surface.

7. The turbofan gas turbine engine according to claim 6, wherein a plurality of aft liner holes is positioned in the rear portion of the annular combustor liner and are configured to fluidly connect the region with a potential recirculation zone.

8. The turbofan gas turbine engine according to claim 7, wherein the radial support wall defines a generally perpendicular angle with an axis of the combustor and the second aft side surface of the radial support wall is positioned such that it defines an obtuse angle with the rear portion.

9. The turbofan gas turbine engine according to claim 8, wherein a lead channel is positioned such that the lead channel is configured to fluidly connect the region with the opening.

10. The turbofan gas turbine engine according to claim 1, wherein the radial support wall has a first leading side surface and a second aft side surface and a plurality of undulations is formed on the first leading side surface.

11. The turbofan gas turbine engine according to claim 1, wherein the radial support wall has a first leading side surface and a second aft side surface and a plurality of undulations is formed on the second aft side surface.

12. A turbofan gas turbine engine configured to reduce hotspots within combustors, the turbofan gas turbine engine comprising:
an axis;
a combustor circumferentially disposed about the axis; the combustor comprising:
an annular combustor dome;
an annular combustor liner that includes a front portion and a rear portion and the annular combustor liner is joined to the annular combustor dome via the front portion and defines a chamber and a nozzle is mounted within the annular combustor dome and is configured to inject fuel into a plurality of swirlers;
a plurality of dilution openings is circumferentially distributed around the annular combustor liner such that a region is fluidly connected through the annular combustor liner to the chamber;

each one of the plurality of dilution openings includes an opening and a radial support wall that is positioned aft of the opening such that the radial support wall extends into the chamber;
each one of the plurality of dilution openings defines an annular slot;
a lead channel fluidly connects the region with the opening;
the radial support wall has a first leading side surface and a second aft side surface;
at least one hole is defined through the radial support wall such that the first leading side surface is fluidly connected with the second aft side surface;
a plurality of undulations is formed on at least one of the first leading side surface and the second aft side surface;
a plurality of aft liner holes is positioned in the rear portion of the annular combustor liner and are configured to fluidly connect the region with a potential recirculation zone;
and wherein the radial support wall defines a generally perpendicular angle with an axis of the combustor and the second aft side surface of the radial support wall is positioned such that it defines an obtuse angle with the rear portion.

13. The turbofan gas turbine engine according to claim 12 wherein a lead channel fluidly connects the region with the opening.

14. The turbofan gas turbine engine according to claim 13, wherein a vane that is configured to direct dilution air is positioned in the lead channel.

15. The turbofan gas turbine engine according to claim 12, wherein a hole is defined through an overlapping liner portion of the annular combustor liner and fluidly connects the region to one of: the lead channel, the opening, and a combination thereof.

16. The turbofan gas turbine engine according to claim 12, wherein the radial support wall has a first leading side surface and a second aft side surface and a plurality of undulations is formed on the first leading side surface.

17. The turbofan gas turbine engine according to claim 12, wherein the radial support wall has a first leading side surface and a second aft side surface and a plurality of undulations is formed on the second leading side surface.

18. A method for reducing hotspots in a combustor turbofan gas turbine engine that includes an axis; a combustor circumferentially disposed about the axis; and the combustor includes an annular combustor dome; an annular combustor liner that includes a front portion and a rear portion and the annular combustor liner is joined to the annular combustor dome via the front portion and defines a chamber and a nozzle is mounted within the annular combustor dome and is configured to inject fuel into a plurality of swirlers; at least one or more dilution openings are circumferentially distributed around the annular combustor liner such that a region is fluidly connected through the annular combustor liner to the chamber; each one of the one or more dilution openings includes an opening and a radial support wall that is positioned aft of the opening such that the radial support wall extends into the chamber; each one of the one or more dilution openings defines an annular slot; a lead channel fluidly connects the region with the opening, the method comprising the steps of:
causing combustion gases to flow through the chamber past the one or more dilution openings;
introducing dilution air in the chamber via the one or more dilution openings; and causing combustion gases to swirl and mix as a result of introducing the dilution air forward of the radial support wall.

19. The method according to claim 18, further comprising the steps of:
introducing dilution air via holes through the rear portion of the annular combustor liner aft of the radial support wall and thereby reducing potential recirculation zones.

\* \* \* \* \*